United States Patent [19]
Fanslau, Jr.

[11] Patent Number: 5,943,190
[45] Date of Patent: Aug. 24, 1999

[54] MAGNETIC HEAD GIMBAL WITH SPRING LOADED TANGS

[75] Inventor: Edmund B. Fanslau, Jr., San Jose, Calif.

[73] Assignee: Read-Rite Corporation, Milpitas, Calif.

[21] Appl. No.: 08/823,117

[22] Filed: Mar. 25, 1997

Related U.S. Application Data

[63] Continuation of application No. 08/560,886, Nov. 20, 1995, abandoned.

[51] Int. Cl.$^6$ ......................................................... G11B 5/48
[52] U.S. Cl. ................................................................. 360/104
[58] Field of Search ..................................... 360/103, 104

[56] References Cited

U.S. PATENT DOCUMENTS

| | | | |
|---|---|---|---|
| 5,021,907 | 6/1991 | Zak | 360/104 |
| 5,079,659 | 1/1992 | Hagen | 360/104 |
| 5,161,076 | 11/1992 | Inomuchi et al. | 360/104 |
| 5,282,102 | 1/1994 | Christianson | 360/104 |
| 5,299,080 | 3/1994 | Mizuno et al. | 360/103 |
| 5,377,064 | 12/1994 | Yaginuma et al. | 360/104 |
| 5,428,489 | 6/1995 | Takamure et al. | 360/104 |
| 5,490,027 | 2/1996 | Hamilton et al. | 360/104 |
| 5,499,153 | 3/1996 | Uemura et al. | 360/103 |

*Primary Examiner*—Brian E. Miller
*Attorney, Agent, or Firm*—Nathan N. Kallman

[57] ABSTRACT

A magnetic head suspension, includes a load beam and a gimbal that supports an air bearing slider, and which provides an electrical connection thereto. The gimbal includes a cantilevered tongue and resiliently deformable tangs that extend laterally from the tongue, within a clearance delineated in part by the tongue. When the tangs are in an unbiased state, they project below the geometric plane of the tongue for contacting the slider and for establishing electrical contact therewith. The tangs can deflect independently during bonding to the slider for maintaining independent spring force against the slider. In one embodiment, the electrical conductive path is connected to ground potential for discharging static electricity generated between the slider and a rotating magnetic disk.

10 Claims, 5 Drawing Sheets

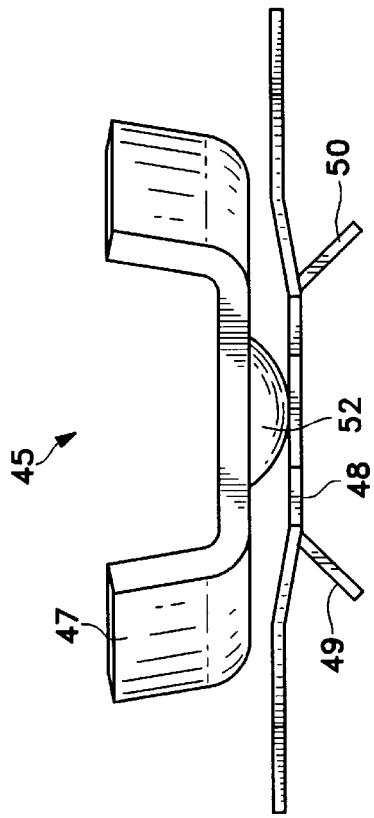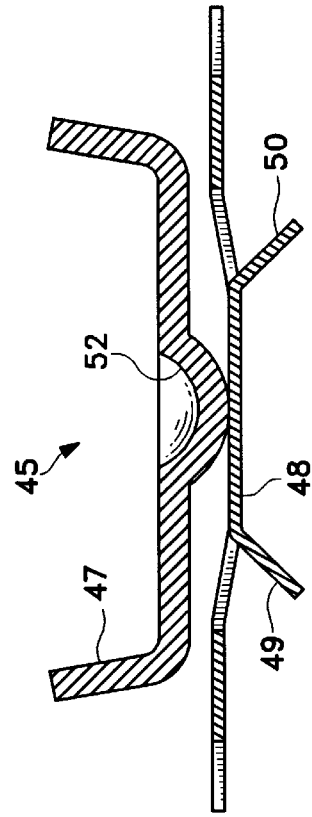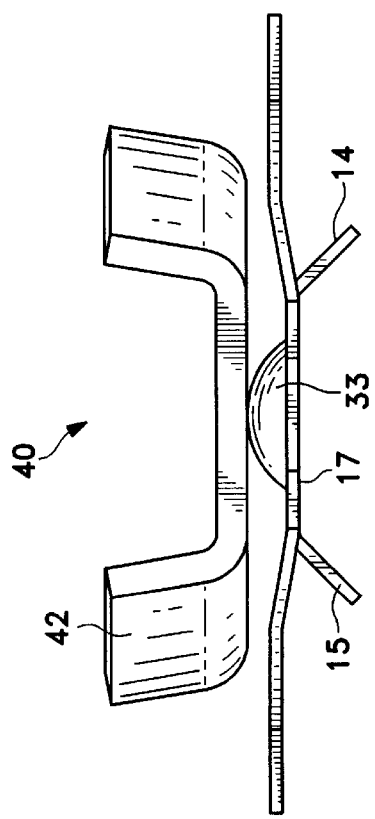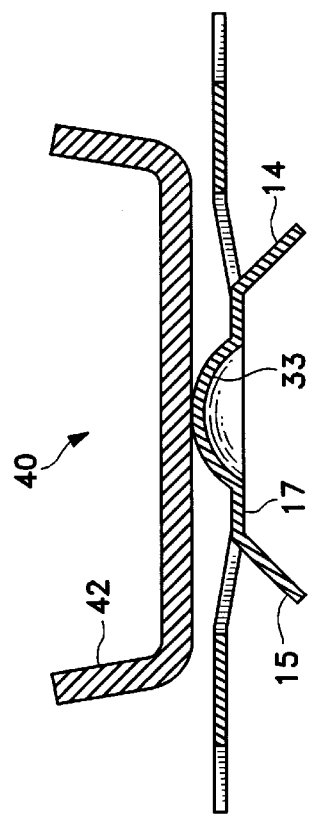

MAGNETIC HEAD GIMBAL WITH SPRING LOADED TANGS

This application is a continuation of application Ser. No. 08/560,886, filed Nov. 20, 1995, now abandoned.

FIELD OF THE INVENTION

This invention relates to an improved magnetic head suspension assembly and in particular to a modified gimbal with spring loaded contact tangs for supporting a hydrodynamic air bearing slider over a rotating magnetic disk.

DESCRIPTION OF THE PRIOR ART

Disk drives typically include a stack of spaced apart, concentric disks mounted on a common shaft, and an actuator arm assembly encased within a housing. The actuator arm assembly comprises a plurality of arms extending into spacings between the disks. Mounted on the distal end of each arm is a resilient suspension assembly which in turn carries a slider. Included in the suspension assembly is a load beam, which is mounted at one end to the actuator arm by means of a baseplate, and a gimbal or flexure which is attached to the other end of the load beam and pivotally supports the slider.

An exemplary gimbal configuration for supporting the slider is described in U.S. Pat. No. 5,079,659 to Hagen. The gimbal includes four tabs positioned at the four corners of the gimbal surface for applying inward forces on the slider at these corners in order to secure the gimbal to the slider. This gimbal design may experience manufacturing variance in the four tabs which would cause gimbal-to-slider bias that, in turn, affects the flying height performance of the slider.

The load beam provides the resilient spring action which biases the slider toward the surface of the disk. The slider is supported adjacent to the data surface of the disk by aerodynamic forces generated by the rotational movement of the disk. A magnetic transducer is employed to interact with the disk, and is affixed to the slider. The gimbal resiliently supports the slider and allows it to move vertically and to pitch and roll while it follows the topography of the rotating disk. Typically, the gimbal is connected to the slider by an adhesive. The adhesive connection tends to insulate electrically the slider from the gimbal. As the slider follows the topography of the rotating disk, electrostatic charge accumulates on the slider and impedes the performance of the read and write operations between the transducer and the magnetic disk. It would be desirable to provide an electrical conduction path between the slider and ground to prevent the accumulation of electrostatic charge.

Attempts to provide such a conduction path included the use of a conductive epoxy as an adhesive. Conductive epoxy may include a mix of an epoxy and a conductive filler such as silver particles. These particles are in contact with one another and create a conductive chain between the slider and the gimbal. In order to create the conductive chain, the particles must be relatively large in size. As the gimbal is bonded to the slider, these large particles can prevent a parallel bond between the slider and the gimbal spring. In other words, the slider surface will not be parallel to the gimbal surface. This is a disadvantage because accurate positioning of the transducer over individual data tracks on the rotating magnetic disk is essential to proper disk drive performance. In addition, the filler particles used in conductive epoxy reduce the overall bond strength of the epoxy. Therefore, it is preferable to use adhesives that do not contain fillers so that the connection between the gimbal and the slider is a strong, parallel bond.

One method for providing a conduction path between the gimbal and the slider is described in U.S. Pat. No. 5,021,907 to Zak. This patent describes a gimbal spring apparatus with tabs extending therefrom and positioned adjacent to a gimbal. However, these tabs extend through the adhesive layer to establish electrical contact with the slider, which compromises the integrity of the electrical connection.

The prior art lacks a simple method of bonding the slider to the gimbal while simultaneously providing a good electrical path and an electrostatic discharge conduction path to the slider.

SUMMARY OF THE INVENTION

An object of this invention is to provide a head gimbal assembly that optimizes the parallelism between the slider and the gimbal for maintaining a relatively stable flying height of the slider above the rotating magnetic disk.

Another object of this invention is to provide a gimbal that minimizes the crown induced by the bonding adhesive, that maintains the integrity of the adhesive, and provides an effective bond even under severe operating conditions.

Another object of this invention is to ensure a minimal resistance between the slider and the gimbal.

Another object is to provide a novel magnetic head gimbal assembly capable of establishing an electrical path and electrostatic discharge conduction path to the slider.

According to this invention, a magnetic head suspension assembly includes a load beam for supplying a directed force to an air bearing slider to maintain the slider at a desired height above the disk surface. The suspension assembly includes a gimbal that supports the slider and provides an electrical connection thereto. The gimbal includes a cantilevered tongue, and two resiliently deformable tangs that extend laterally from the tongue, within a clearance delineated in part by the tongue. When the tangs are in an unbiased state, they project below the geometric plane of the tongue for engaging the slider and for establishing electrical contact therewith.

The tangs form an angle a with the tongue, and define two compliant and deformable edges therewith. The angle α is selected such that elastic deformation still occurs along the deformable edges of the tangs, when the tongue is secured to the slider, for maintaining adequate contact force between the slider and the tips of the tangs, and for establishing an electrical conductive path between the tongue and the slider. The tangs can deflect independently during bonding to the slider for maintaining independent spring force against the slider. In one embodiment, the electrical conductive path is connected to ground potential for discharging static electricity generated between the slider and the rotating magnetic disk. The tongue is bonded to the slider by means of an adhesive layer, such that the adhesive layer is not allowed to extend beyond or underneath the tips of the tangs in order to ensure a proper electrical contact between the tangs and the slider.

BRIEF DESCRIPTION OF THE DRAWING

The invention will be described in greater detail with reference to the drawing in which:

FIG. 10 is a rear elevational view of a magnetic head suspension comprised of the gimbal of the preceding figures, and a load beam, illustrating a dimple as part of the tongue and bearing against the load beam;

FIG. 11 is a sectional view of the suspension of FIG. 10, taken along line 11—11;

FIG. 12 is a rear elevational view of another suspension, illustrating the dimple as part of the load beam and bearing against the tongue; and FIG. 13 is a sectional view of the suspension of FIG. 12, taken along line 13—13.

Similar numerals refer to similar elements in the drawing. It should be understood that the sizes of the different components in the figures may not be to scale, or in exact proportion, and are shown for visual clarity and for the purpose of explanation.

DETAILED DESCRIPTION OF THE INVENTION

Figure 1:
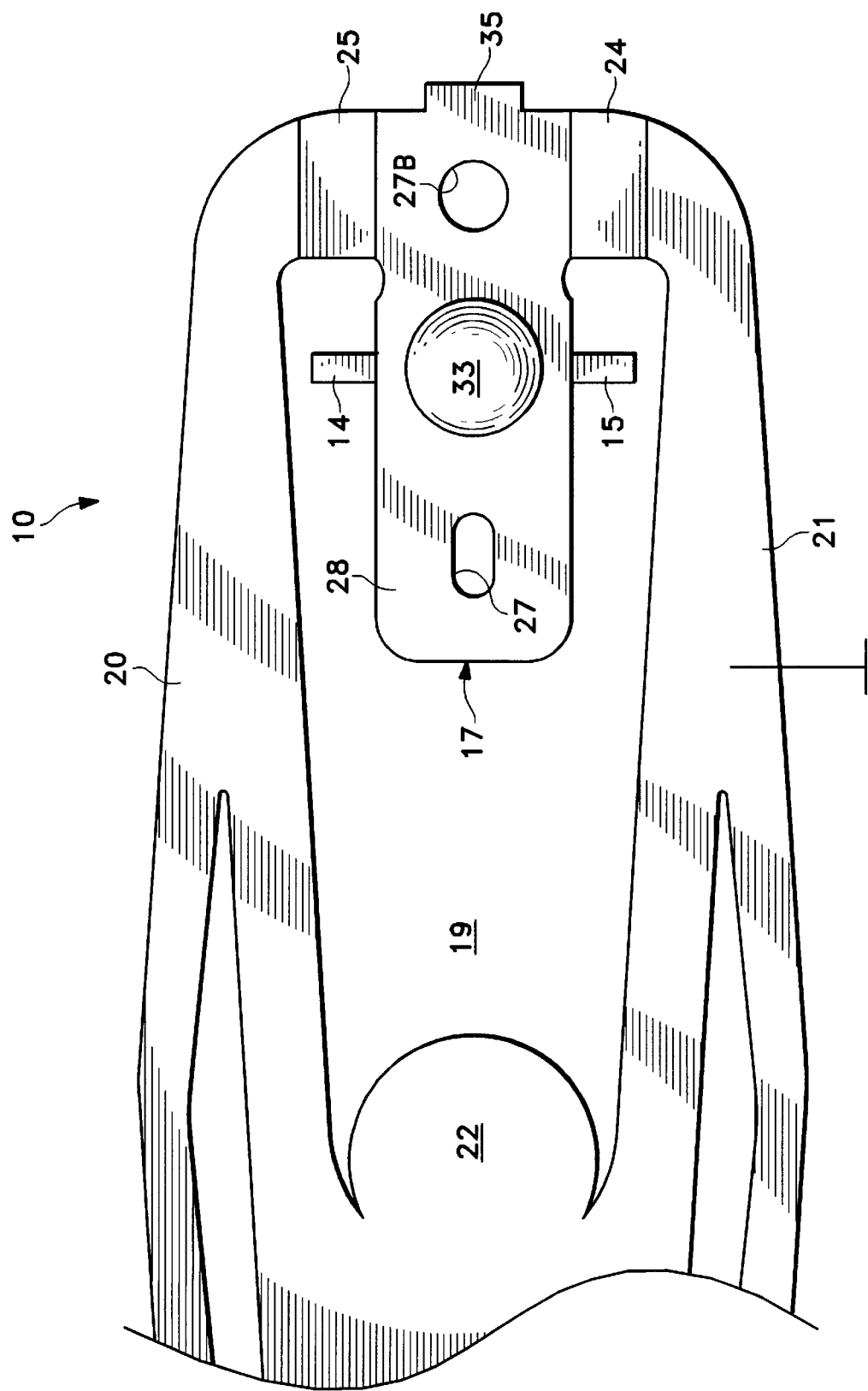
FIG. 1 is a top plan view of part of a gimbal which includes two spring loaded contact tangs shown connected to ground potential, according to the present invention.

FIG. 1 illustrates part of a gimbal 10 shown connected to ground potential, and forming part of a magnetic head suspension. It is an objective of the present invention to further connect this ground potential to a slider 12 (FIG. 6), in a simple and efficient way. In the preferred embodiment, such connection is established by means of a pair of tangs or tabs 14, 15 that extend laterally from a cantilevered tongue 17, within a clearance 19, formed between the outline of the tongue 17, a pair of outriggers 20, 21, a weld island 22, and the inner outline of a pair of connecting parts 24, 25.

The underside of the tongue 17 includes a planar lower mounting surface 26 (FIG. 3) for connection to the slider 12. The tongue also has an upper surface 28, opposite to the lower mounting surface 26, with a dimple 33 protruding upwardly for establishing a point contact with a load beam, as illustrated in FIGS. 10 and 11. UV holes 27, 27B are provided in the tongue 17 for curing an adhesive layer 29 (FIG. 5) deposited on the underside of the tongue 17. A shear tab 35 is integrally formed with the tongue 17.

The general layout of the gimbal 10 is basically similar to that of conventional gimbals so that minimal changes to the manufacture process and tools are required. Only one die would still be required to form the gimbal 10. However, the present gimbal design differs from that of the prior art in several respects. For example, the tongue size is reduced so that the clearance 19 is sufficiently large for accommodating the tangs 14 and 15.

Figure 2:
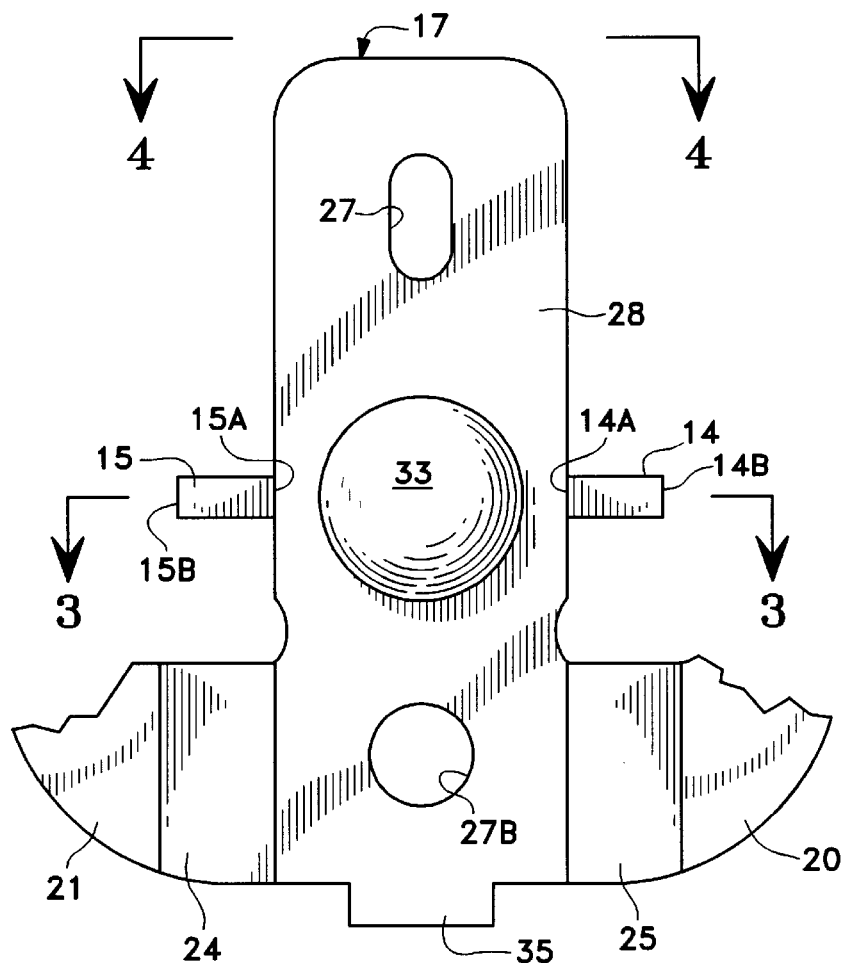
FIG. 2 is an enlarged fragmentary detail view of a tongue forming part of the gimbal of FIG. 1, showing the two tangs extending laterally from the tongue.
Figure 3:
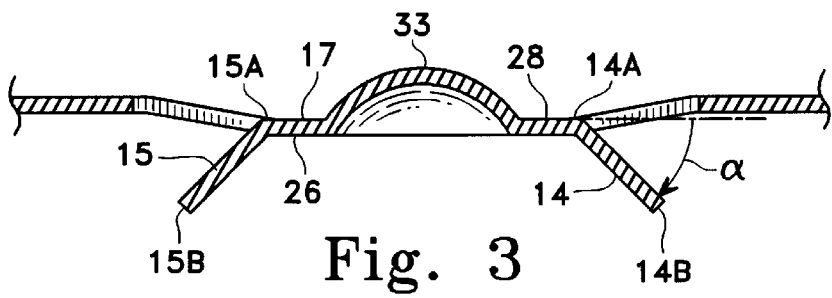
FIG. 3 is sectional view of the gimbal of FIG. 2, taken along line 3—3.
Figure 4:
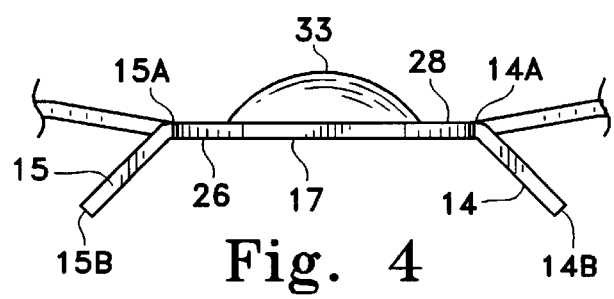
FIG. 4 is a rear elevational view of the gimbal of FIG. 2, taken along line 4—4.

FIGS. 2 through 4 illustrate the tongue 17 and the two tangs 14, 15 in an unbiased state, prior to the application of the adhesive layer 29. In the context of this invention, the terms "unbiased state" refer to a free, formed, preformed or prebent state. The tangs 14, 15 are simultaneously formed along with the tongue 17 by means of known techniques, such as a photoetching or a stamping process, and then forming with a die. As a result, the tangs 14, 15 possess spring-like properties, and can resiliently deform when it is bonded to the slider 12.

The tangs 14, 15 are generally identical. Each of these tangs 14, 15 is flat and preferably rectangularly shaped. It projects downwardly, below the geometric plane defined by the planar lower mounting surface 26 of the tongue 17 for establishing electrical contact with the slider 12. This contact provides an electrical discharge path from the slider 12 to the gimbal 10 for discharging static electricity generated between the slider 12 and a rotating magnetic disk (not shown).

Each tang 14, 15 forms an angle "$\alpha$" typically ranging between 10 degrees and 50 degrees, with the planar surface of the tongue 17, and defines a compliant and deformable edge 14A, 15A therewith. The tangs 14, 15 are formed adjacent to, and symmetrically relative to the dimple 33. However, in other embodiments, it would be possible to form one or more tangs, i.e., 14, 15 at any free edge of the tongue 17, so long as the resulting forces exerted on the tongue 17 do not disturb the tongue-to-slider parallelism. The angle $\alpha$ is selected such that elastic deformation still occurs in the bend areas, along the edges 14A, 15A, for maintaining adequate contact force between the free tips 14B, 15B of the tangs, and the slider 12.

Referring specifically to FIG. 2, the tips 14B, 15B of the tangs 14, 15, respectively, are shown to be linearly shaped. However, it should be understood that these tips 14B, 15B may assume different shapes. For instance, these tips 14B, 15B may be rounded or pointed or with different contours, as long as after bonding they establish sharp point contacts with the slider 12 in order to establish a secure grounding or electrical path to the slider 12.

The tangs 14, 15 are formed integrally with the tongue 17, and therefore they have the same thickness as that of the tongue 17. The length of the tangs 14, 15 is selected so that each of the tangs 14, 15 can deflect during bonding, but still maintains an independent spring force against the slider 12. In this embodiment, each tang 14, 15 has a width of approximately 0.003 inch.

Figure 5:
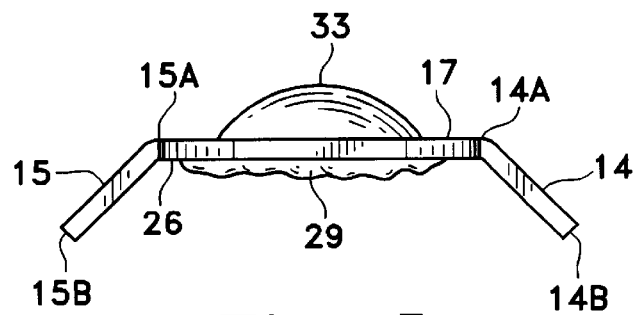
FIG. 5 is a rear elevational view of the gimbal of FIG. 4 showing an adhesive layer deposited on the underside of the tongue.
Figure 6:
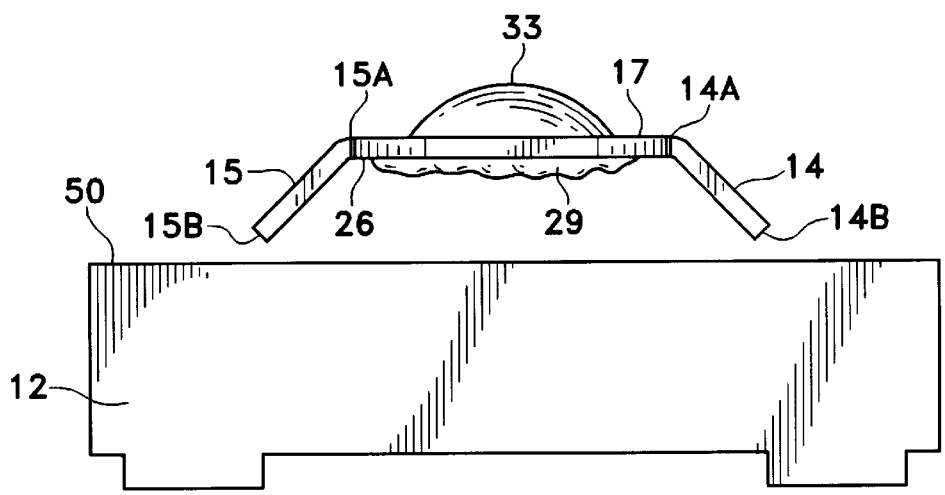
FIG. 6 is a rear elevational view of the gimbal of FIG. 5, including a slider, prior to bonding to the tongue and tangs.
Figure 7:
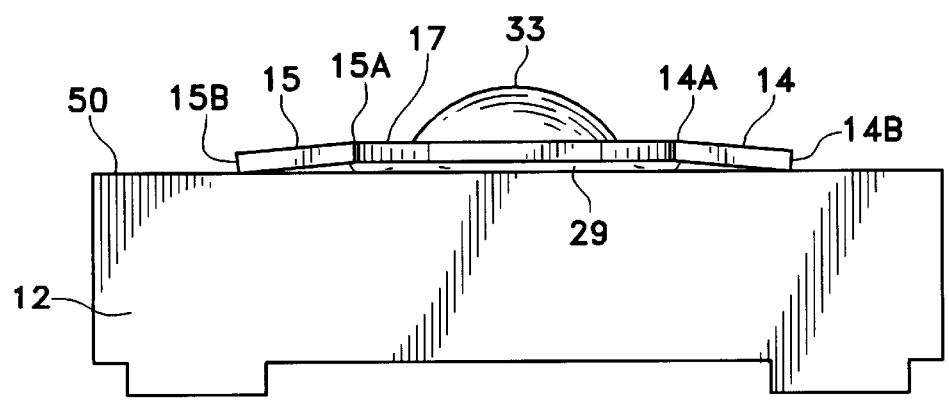
FIG. 7 is a rear elevational view of the gimbal of FIG. 6 shown bonded to the slider, and illustrating the spring action of the tangs.

FIGS. 5 through 7 illustrate the bonding process for joining the tongue 17 and the slider 12. FIG. 5 illustrates the step of depositing the adhesive layer 29 on the underside of the tongue 17, by filling the dimple 33 with adhesive material, and allowing this material to overflow the contour of the dimple 33.

FIG. 6 illustrates the second step, and shows a gimbal-slider assembly formed with the upper surface of the slider 12 being parallel to the lower mounting surface 26 of the tongue 17. The tangs 14, 15 are depicted in a downward, unbiased position, ready to contact the upper surface of the slider 12.

FIG. 7 illustrates the third step of the bonding process, namely pressing the tongue 17 almost flat against the upper surface of the slider 12. As a result, the tangs 14, 15 are deflected upwardly, forcing the angle $\alpha$ to be only a few degrees. The adhesive layer 29 is then cured and the tongue 17 released. After curing, the tongue 17 and the slider 12 maintain their relative position, even with significant ambient conditions similar to those encountered during the operation of a disk drive.

Figure 8:
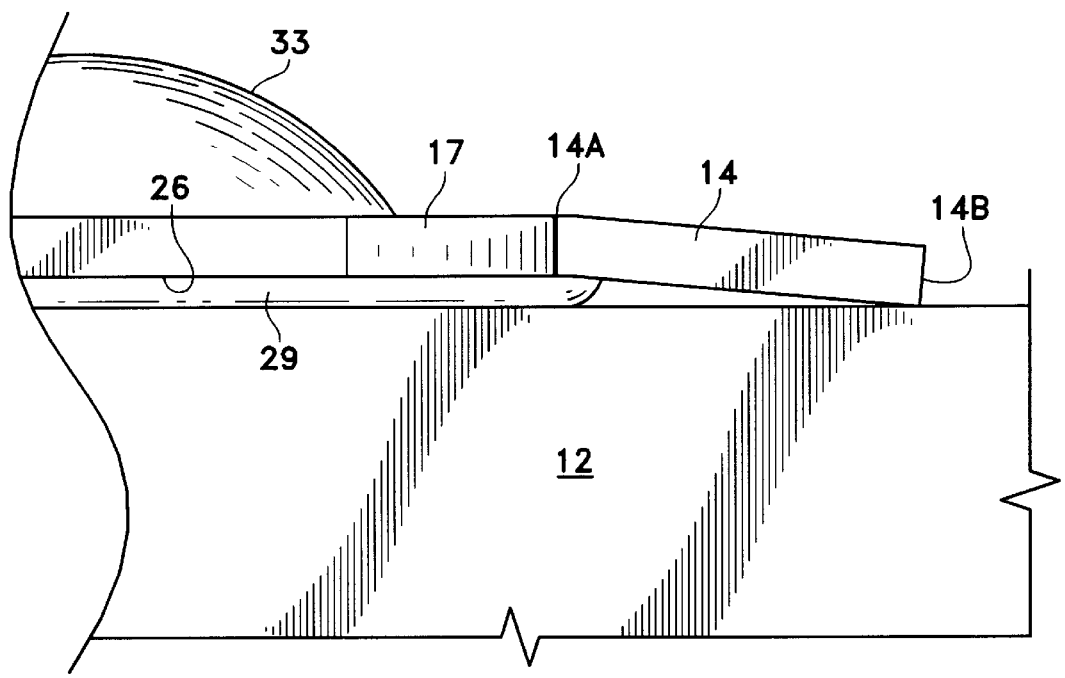
FIG. 8 is an enlarged fragmentary view of the slider and gimbal of FIG. 7, illustrating the extent of the adhesive flow after bonding, as well as the contact between one tang and the slider.
Figure 9:
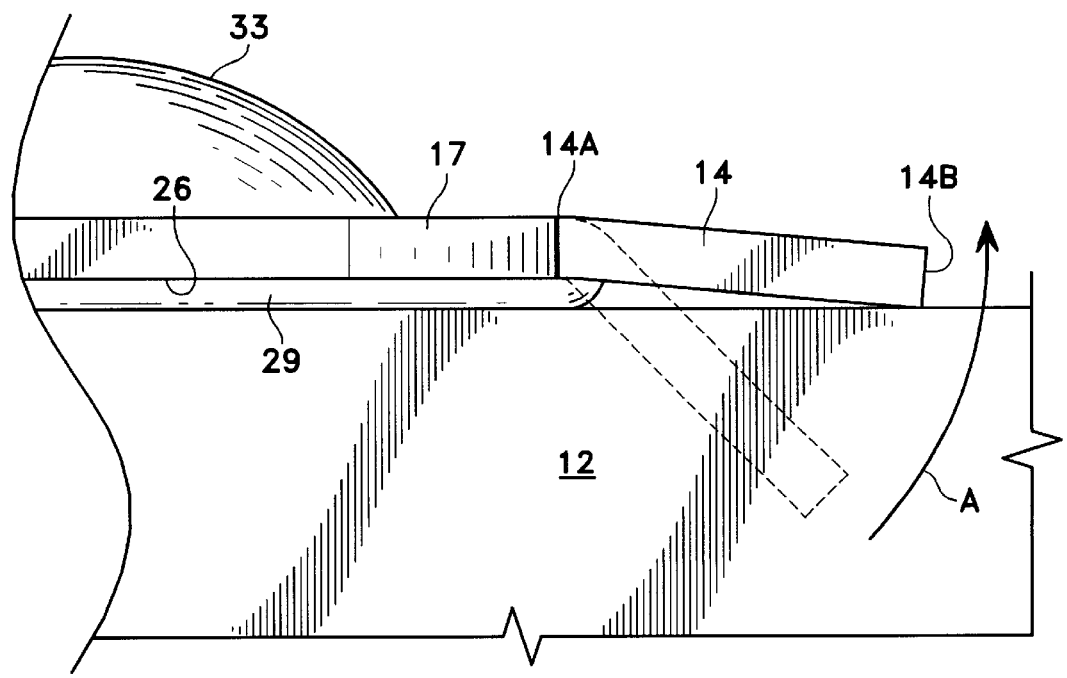
FIG. 9 is a similar view to that of FIG. 8, showing one tang in an unbiased position (dashed line), and in a deflected position (solid line)

With reference to FIGS. 8 and 9, the tips 14B, 15B of the tangs 14, 15 (only tang 14 being shown) are forced into intimate contact with the upper surface of the slider 12 to establish a conductive path between the tongue 17 and the slider 12. As the tangs 14, 15 are deformed, the adhesive layer 29 expands outward as it is compressed and its overall thickness diminishes. It should be noted that the adhesive layer 29 does not extend beyond or beneath the tips 14B, 15B of the tangs 14, 15. This will ensure a proper electrical contact between tips 14B, 15B and the slider 12, regardless of the types of the conductive properties of the adhesive layer 19. As a result, it is now possible to optimize the selection of the adhesive type since the structural or mechanical strength of the adhesive layer 29 will not be compromised for the sake of providing an electrical conduction path.

FIG. 9 further clarifies the deformation of one tang 14, before bonding to the slider (shown in dashed lines), and after bonding (shown in solid lines). The direction of deformation is indicated by the arrow A.

The gimbal 10 can accommodate significant manufacturing tolerances. For instance, the two angles α formed between the tangs 14, 15 and the tongue 17 do not necessarily have to be identical. In fact, the tangs 14, 15 may be allowed to deflect differently relative to the tongue 17, so long as the tongue 17 is secured to the slider 12. The final positions of the tangs 14, 15 are irrelevant to the present design, since the tongue to slider parallelism will be maintained after the adhesive layer 29 is cured.

FIGS. 10 and 11 illustrate one embodiment of a magnetic head suspension 40, prior to assembly to the slider 12, comprising the tongue 17, the tangs 14, 15, and part of a load beam 42. In this particular embodiment the dimple 33 forms part of the tongue 17, and bears against the load beam.

FIGS. 12 and 13 illustrate another embodiment of a magnetic head suspension 45 comprising part of a load beam 47, a tongue 48, and a pair of tangs 49, 50. In this alternative embodiment the tongue 48 is flat, and the tangs 49, 50 are similar to the tangs 14, 15 of the previous suspension 40. A dimple 52 is formed in the load beam 47 and bears against the tongue 48.

The adhesive used for joining the tongue and the slider may be conductive or nonconductive. A conductive adhesive for this purpose is Masterbond EP21TDC/S. A nonconductive adhesive that may be used is Loctite UV 366.

By virtue of this invention, a head gimbal assembly is configured with deformable tangs that make electrical contact with an air bearing slider. In a preferred embodiment, a conductive path and electrostatic discharge path are formed by means of an electrically conductive adhesive.

It should be understood that the invention is not limited to the specific parameters, materials and embodiments described above and that various modifications may be made within the scope of the present invention.

What is claimed is:

1. A magnetic head assembly comprising:
   an air bearing slider having a top surface;
   a head gimbal assembly including a load beam;
   a cantilevered tongue formed with said load beam for joining said tongue and load beam to said slider, said tongue having a geometric plane and a longitudinal axis and an underside for mounting said tongue to said top surface of said slider;
   a dimple formed on said tongue;
   opposing spring-loaded resiliently deformable rectangular tangs that extend laterally relative to said longitudinal axis of said tongue and in lateral alignment with said dimple, said tangs being in a preformed, prebent unbiased state prior to joining said tongue to said slider, said tangs projecting below the geometric plane of said tongue in the unbiased state, each of said tangs defining an angle relative to the geometric plane of said tongue during the unbiased state, said tangs having tips for making contact with the top surface of said slider during a biased state of said tangs;
   an adhesive layer deposited on said underside of said tongue for bonding said tongue to said slider;
   wherein said tangs are deflected to a substantially flat position to assume a biased state and for establishing simultaneously an electrical conductive path between said slider and said tongue, and an electrical discharge conduction path while in said biased state to thereby provide a spring force against the slider, and wherein said adhesive layer does not extend beyond or underneath the tips of said tangs to ensure a proper electrical contact between said tips of said tangs and said slider.

2. The magnetic head gimbal assembly of claim 1, wherein said each of said tangs projecting orthogonally relative to said tongue, said tangs being compliant and deformable when said tongue is secured to said slider for maintaining contact between said tangs and said slider.

3. The magnetic head gimbal assembly of claim 1, wherein said angle is in the range of 10 degrees to 50 degrees.

4. The magnetic head gimbal assembly of claim 1, wherein said tangs are formed integrally with said tongue.

5. The magnetic head gimbal assembly of claim 1, wherein said tangs are formed to deflect independently during bonding to said slider for maintaining independent spring force against said slider.

6. The magnetic head gimbal assembly of claim 1, wherein said electrical conductive path is connected to a ground potential for discharging static electricity generated between said slider and a rotating magnetic disk.

7. The magnetic head gimbal assembly of claim 1, wherein said adhesive layer is electrically conductive.

8. The magnetic head gimbal assembly of claim 1, wherein said adhesive layer is electrically nonconductive.

9. The magnetic head gimbal assembly of claim 1, wherein said tangs are oppositely and symmetrically formed relative to said tongue.

10. The magnetic head gimbal assembly of claim 9, wherein said tongue includes a dimple; and wherein said tangs are disposed adjacent to and symmetrically relative to said dimple.

* * * * *